(12) United States Patent
Eich et al.

(10) Patent No.: US 7,158,873 B2
(45) Date of Patent: Jan. 2, 2007

(54) METHOD OF CONTROLLING AN AUTOMATED CLUTCH OF A VEHICLE

(75) Inventors: Jürgen Eich, Bühl (DE); Thomas Jäger, Meckenbeuren (DE); Bernhard Boll, Alling (DE); Frank Bast, Kürnbach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 80 days.

(21) Appl. No.: 10/629,860

(22) Filed: Jul. 24, 2003

(65) Prior Publication Data

US 2004/0064232 A1   Apr. 1, 2004

Related U.S. Application Data

(63) Continuation of application No. PCT/DE02/00160, filed on Jan. 21, 2002.

(30) Foreign Application Priority Data

Jan. 24, 2001   (DE) ............................... 101 03 030

(51) Int. Cl.
*B60W 10/02* (2006.01)
*B60K 23/00* (2006.01)
*G06F 19/00* (2006.01)
*G06F 17/00* (2006.01)

(52) U.S. Cl. .................. 701/68; 701/67; 477/174; 477/175

(58) Field of Classification Search ............... 701/67, 701/71, 80, 82, 90, 68; 192/84.6, 85 C, 90, 192/91 R; 477/86, 104, 70, 166, 174, 175, 477/176
See application file for complete search history.

(56) References Cited

U.S. PATENT DOCUMENTS

| | | | | |
|---|---|---|---|---|
| 5,993,352 | A * | 11/1999 | Kosik et al. | 477/74 |
| 6,132,336 | A * | 10/2000 | Adachi et al. | 477/169 |
| 6,246,945 | B1 * | 6/2001 | Fritz et al. | 701/70 |
| 2002/0134637 | A1 * | 9/2002 | Salecker et al. | 192/54.1 |
| 2002/0137597 | A1 * | 9/2002 | Genise et al. | 477/107 |

FOREIGN PATENT DOCUMENTS

| | | |
|---|---|---|
| DE | 195 04 847 A1 | 9/1995 |
| DE | 197 51 455 A1 | 5/1999 |

* cited by examiner

*Primary Examiner*—Thomas Black
*Assistant Examiner*—Christine M. Behncke
(74) *Attorney, Agent, or Firm*—Darby & Darby

(57) ABSTRACT

A method of controlling an automated clutch of a vehicle includes the step of adapting a characteristic curve of the clutch through an electronic clutch management system. The adaptation is performed under at least one set of operating conditions that are represented by an operating point.

27 Claims, 3 Drawing Sheets

METHOD OF CONTROLLING AN AUTOMATED CLUTCH OF A VEHICLE

CROSS-REFERENCE TO RELATED APPLICATION

This application is a continuation of International Patent Application Serial No. PCT/DE02/00160 filed Jan. 21, 2002, which is hereby incorporated by reference in its entirety.

BACKGROUND OF THE INVENTION

The present invention relates to a method for controlling and/or regulating an automated clutch in a vehicle, wherein a characteristic curve of the clutch is adapted by means of an electronic clutch management system (ECM).

Automated clutches belong to the known state of the art of automotive technology. They allow a complete automation of the drive train of a vehicle, in particular a motor vehicle. Also known is the use of automated clutches in connection with automatic transmissions. In particular, the process of moving the clutch into engagement during a gear-shifting process is automated by means of the electronic clutch management (ECM) system.

The known process allows an adaptation of the characteristic curve of the clutch. Thus, the characteristic curve of the automated clutch can be altered in a suitable manner, e.g., based on possible influence factors.

However, with the known process the adaptation is dependent on the occurrence of a predetermined stationary operating point. This operating point can be present for example when shifting into first gear while the engine is idling and the service brake or hand brake is applied. Depending on the habits of the driver of the vehicle, this stationary operating point may occur extremely rarely.

OBJECT AND SUMMARY OF THE INVENTION

The object of the invention is to provide a method of controlling and/or regulating an automated clutch that is improved in particular with respect to the adaptation possibilities.

In the inventive method for controlling and/or regulating an automated clutch, wherein a characteristic curve of the clutch is adapted by means of an electronic clutch management system (ECM), the adaptation is carried out when at least one appropriate set of operating conditions (referred to as operating point) is present. For example, it is possible for the characteristic curve of the clutch to be adapted during each start-up or shift process, so that the dependence on an operating condition that may occur only rarely is avoided with the method according to the invention.

Of course, the adaptation can also be carried out at other desired operating points besides the aforementioned examples. Thus the adaptation is improved overall with the method according to the invention.

According to an advantageous development of the invention, the adaptation can be carried out by using a suitable theoretical model. Thus a model-supported adaptation of the characteristic curve of the clutch can be carried out. Based on a model of the characteristic curve of the clutch it is possible to carry out an adaptation of the point of incipient frictional contact (also referred to as take-up point) and of the coefficient of friction and/or of the shape of the characteristic curve of the clutch. In principle, this adaptation can take place every time the clutch goes through a slipping phase. It is also possible that with certain operating conditions or operating points, suitable restrictions are imposed on the adaptation. For example, shortly after the engine has been started, the engine torque signal may have a reduced reliability. In this case it can be advantageous to provide for a temporary suppression of the adaptation.

In a further development of the invention, at least one input variable is taken into account in the adaptation of the characteristic curve of the clutch. Preferably the characteristic curve of the clutch can be adapted based primarily on predetermined signals, such as for example engine rpm-rate, effective engine torque, and/or clutch actuator position. Of course, it is also conceivable to use other signals as input quantities for the adaptation.

According to an advantageous development of the invention, at least one delay block is used in the adaptation of the characteristic curve of the clutch. Preferably delay blocks can be used, e.g., with the input quantities engine rpm-rate, engine torque, and/or clutch actuator position. These delay blocks serve to compensate for a possible time shift between the signals that can result, e.g., from the signal acquisition and/or the signal transmission, so that at the output end of the delay blocks, the respective signals of the input quantities correspond physically to the same point in time.

According to another development of the invention a suitable adaptation algorithm is integrated in the adaptation of the characteristic curve of the clutch. The clutch torque is first estimated from the current position of the clutch actuator by means of a characteristic curve model without the adaptation algorithm. Together with the engine torque, the estimate allows a determination of the rotary acceleration of the internal combustion engine, from which a theoretical engine rpm-rate can be calculated. Based on the discrepancy between the actually measured rpm-rate and the theoretical engine rpm-rate, it is possible to evaluate the quality of the model data based on the actual deriving experience and to gain information for adapting the model data to the physically accurate values.

As a means of performing this adaptation, it is particularly advantageous to use an adaptation algorithm. The adaptation algorithm can perform an adjustment of the signals and/or the parameters as a function of the current operating point or driving condition. For example, a slipping state of the clutch can be used as a basis for adapting the model. When using an adaptation algorithm, it is particularly advantageous to include a correction term for the engine acceleration. This can be accomplished, e.g., according to the principle of a status monitor, in order to avoid discrepancies between the model values and the actual values.

Moreover, the adaptation algorithm can also include a torque correction term. The torque correction term serves to take a constant or slowly variable error of the torque signal into account. Such errors, which originate from uncertainties in determining the engine torque and/or from unknown torque-consuming units such as, e.g., a generator, an air-conditioning compressor or other device, can usually be identified very readily as a non-zero amount of torque that is present while the clutch is disengaged and the engine is idling.

The adaptation algorithm can further include a correction term for the clutch actuator displacement. This correction term is synonymous with the so-called take-up-point adaptation or contact point adaptation.

It is also possible for a characteristic curve parameter to be used in the adaptation algorithm. This can be a signal vector that serves to adapt the coefficient of friction of the clutch. By adapting, e.g., several suitable characteristic curves, similar effects can be achieved as with a multi-stage adaptation of the friction coefficient.

According to a further developed embodiment of the invention, a variety of models can be used for the design of the adaptation algorithm. For example, one could use a parameter identification of a preferably nonlinear character. Of course, it is also possible to use a so-called extended Kalman filter (EKF). Moreover, it is also conceivable to use so-called neuro-fuzzy methods in the design of the adaptation algorithm. Of course, there are other suitable design options, including a suitable combination of the aforementioned design possibilities.

It is particularly advantageous, if the current driving status or operating point is taken into account in a suitable manner when designing the adaptation algorithm. Dependent on the physical situation, a difference between the measured and the theoretically predicted engine rpm-rates will in some cases affect predominantly one adaptation quantity and in other cases predominantly another adaptation quantity. For example, the torque correction term can be adapted when the clutch is out of engagement and when the clutch is applied lightly, e.g. when starting from rest or creeping. The characteristic curve parameters, on the other hand, are to be adjusted primarily at higher levels of clutch torque.

According to another advantageous concept concerning the adaptation of the clutch characteristic, a second adaptation can be superimposed on a first adaptation. For example, a first adaptation could consist of an adaptation of the coefficient of friction and/or the take-up point. In this first adaptation, a possible discrepancy in the applied torques is determined, e.g., by evaluating a dynamic torque equilibrium at the clutch, and an adjustment of the friction coefficient is made based on the torque discrepancy. A second adaptation, in which preferably the shape of the characteristic curve of the clutch is evaluated, can then be superimposed on the first adaptation.

For example, the shape of the characteristic curve of the clutch can in fact deviate from a predetermined nominal characteristic curve shape, due to manufacturing tolerances and/or aging of the clutch, for example due to settling of the lining cushion. With the adaptations described up to this point, correction terms are calculated for a certain characteristic curve position or a characteristic curve area. Thus the shape of the characteristic curve of the clutch can be determined after sufficient adaptation phases. Rapid changes in the friction coefficient may not be detected thereby under certain conditions. It is necessary to perform adaptations at all operating points so that the global change in the friction coefficient is detected over the entire characteristic curve of the clutch.

In the type of adaptation according to the following description, it is particularly advantageous that rapid changes in the friction coefficient are taken into account, and also that it is made possible to determine the shape of the characteristic curve of the clutch repeatedly.

In particular, this adaptation includes a test whether during a slipping phase of the clutch the torque that is called for by the control sweeps through a significant portion of the clutch characteristic, so that sufficient information can be gained about the shape of the clutch characteristic. During this slipping phase, the dynamic equilibrium at the clutch with respect to the engine torque, the acceleration portion, and/or the set clutch torque is evaluated for some predetermined points of the characteristic curve. The actual profile of the clutch characteristic is found from the difference between the actual and predicted torque values.

The invention further offers the possibility that in addition to the previously implemented friction coefficients, an additional correction characteristic of the clutch is taken into account which describes the discrepancies between the actual and the nominal clutch characteristics. The possibility of the superimposition of adaptations will be further described below through examples illustrated in flowcharts. Of course, other suitable adaptation processes are also conceivable within the scope of the inventive method.

According to another advantageous embodiment of the invention, the adaptation of the clutch characteristic is carried out, e.g., in the slip phase of the clutch and in the phase where the engine rpm-rate takes off when the clutch is taken out of engagement in preparation for a gear shift. With this kind of adaptation, the torque acting on the clutch as a result of the engine torque and the rotary acceleration of the engine is compared against the clutch characteristic that is stored in a memory of the control unit. Based on the comparison, an advantageously simple adaptation of the clutch characteristic is achieved. To implement this concept, it is possible, e.g., to evaluate the engine torque equilibrium at the clutch, using the assumption that the occurring errors are caused only by an imbalance of the clutch characteristic. The torque equilibrium at the clutch can be expressed by the equation:

$$J_{engine} * d\omega_{engine}/dt = M_{engine} - M_{clutch}$$

wherein $J_{engine}$=moment of inertia of the engine
$d\omega_{engine}/dt$=rotary acceleration of engine
$M_{engine}$=engine torque
$M_{clutch}$=clutch torque This equation is satisfied for the torques and accelerations of the actual system. The assumption that the clutch torque in the actual system can be calculated from the torque value used in the clutch control and an error torque is expressed in the equation:

$$M_{clutch,\ control} = M_{clutch} + \Delta M_{clutch},$$

wherein $$\Delta M_{clutch} = M_{clutch,\ control} - (M_{engine} - J_{engine} * d\omega_{engine}/dt)$$

$M_{clutch,\ control}$=clutch torque value used in the control unit, and
$\Delta M_{clutch}$=error in clutch torque.

Thus, an error in the clutch torque can be determined from the current engine torque, the rotary acceleration of the engine, and the clutch torque determined in the control unit. As a function of this error, the characteristic curve of the clutch stored in the clutch control unit can be corrected.

The characteristic curve of the clutch can be corrected, e.g., by adjusting the quantities describing the characteristic curve of the clutch, such as, e.g., the coefficient of friction, the contact point of the clutch, or similar quantities. At sufficiently large clutch torques, the coefficient of friction can be adjusted with the quantities or parameters describing the characteristic curve of the clutch. According to the above equations, the coefficient of friction is reduced, e.g., in the presence of a positive torque error and increased, e.g., in the presence of a negative torque error. For example, a crankshaft torque that corresponds to the engine torque corrected by a dynamic torque contribution, can be about 50 Nm, and a clutch torque calculated in the control unit can be about 30 Nm. This indicates a torque error of −20 Nm, as the clutch transmits a torque of 50 Nm rather than the torque of 30 Nm calculated in the control unit. Based n this information, the coefficient of friction must be increased. These data are merely meant as one example and can be expanded if desired.

It is also conceivable to correct, e.g., the parameters for describing the characteristic curve of the clutch. For this, a table or a functional correlation between the control signal of the clutch actuators and the clutch torque is used.

Within the scope of the adaptation of the characteristic curve of the clutch, it is advisable that the corrections of the descriptive parameters or quantities be carried out incrementally. This means that the calculated torque error is not reduced in one correction step. As a result, the stability of the total system is considerably increased, as only small feedback effects, in the sense of a closed-loop regulation, are present. Of course, other suitable corrections are also possible in the method according to the invention.

According to another development of the invention, it is possible to use an integrating process in the adaptation to correct the clutch characteristic, as an alternative to the direct torque evaluation. According to this concept, the engine rpm-rate can be determined from the torque signals through an integration, so that a theoretical engine rpm-rate is determined according to the following equation.

$$\omega_{engine,model} = \frac{1}{J_{engine}} \int (M_{clutch,control} - M_{engine}) dt$$

wherein $\omega_{engine,\,model}$ stands for the angular velocity of the engine that is calculated from the theoretical model.

A comparison of the theoretical engine rpm-rate with the actual engine rpm-rate can be used as a basis for adapting the clutch characteristic. If discrepancies are found between the actual engine rpm-rate and the theoretical engine rpm-rate after the evaluation of the above equation, the characteristic curve of the clutch or the descriptive quantities or parameters, such as e.g. the coefficient of friction, the clutch take-up point, or the like, can be changed suitably based on the deviations. For example, if at a positive engine torque the actual engine rpm-rate is found to be lower than the theoretical rpm-rate, the clutch torque actually applied is greater than the torque value used in the control device, and consequently the value for the coefficient of friction must be increased.

In the integrating method, the changes in the characteristic curve of the clutch are likewise made preferably in incremental steps in order to avoid unstable feedback in the sense of a closed-loop regulation. Stability problems can thus be avoided in the method according to the invention. Of course, other possibilities of changing the clutch characteristic are also conceivable.

According to another advantageous concept of the invention, a multi-stage adaptation can be performed for the coefficient of friction at predetermined constraint points for the friction characteristic, in particular when the clutch or the transmission are first put into operation. With a multi-stage adaptation of the friction coefficient, the constraint points for the adaptation are preferably in the range of high clutch torques. According to a development of the invention, it is particularly advantageous if the changes or adjustments that were made in the friction coefficient at high torque values are transferred to other selected constraint points of the friction characteristic. This can be accomplished during and/or after a full load cycle. This adaptation mode is preferably used when the clutch or transmission is first put into operation. It can be activated or deactivated, e.g., by way of external preset points together with the accelerated adaptation rate which allows greater adaptation increments.

Of course, the adaptation process can also be modified to work for constraint points of the friction characteristic that are not in the range of high clutch torques. In the transfer of the change or adjustment of the friction coefficient to other constraint points, any desired constraint point of the friction coefficient characteristic can be selected.

A predominant portion of the deviation between the pre-initialized clutch characteristic and the actual clutch characteristic consists of an offset of uniform magnitude for all constraint points. In comparison, the shape deviations will make up only a small portion. An approximate compensation of the offset can be achieved by transferring the result for the adaptation at a selected driving cycle to all constraint points of the friction characteristic.

With the inventive method according to the invention, by performing an adaptation cycle of the clutch characteristic when the vehicle is first put into operation and by transferring the changes that were made at the predetermined constraint points to other constraint points, uncomfortable shifts in subsequent normal driving can advantageously be avoided. Moreover, the method according to the invention avoids the problem of falsifying friction coefficient values at already adapted constraint points. Thus, the fine tuning of the clutch characteristic in subsequent driving can be completed earlier by using the inventive method, since essentially only the shape of the characteristic curve of the clutch still needs to be adjusted.

The method according to the invention can in principle be used as described in an electronic clutch management system (ECM) and also in an automated shift transmission. Moreover, it is also conceivable to use the method according to the invention in continuously variable transmissions (CVT).

BRIEF DESCRIPTION OF THE DRAWINGS

Other advantages and advantageous embodiments of the invention are presented below with references to the drawings, wherein.

DETAILED DESCRIPTION OF PREFERRED EMBODIMENTS

Figure 1:
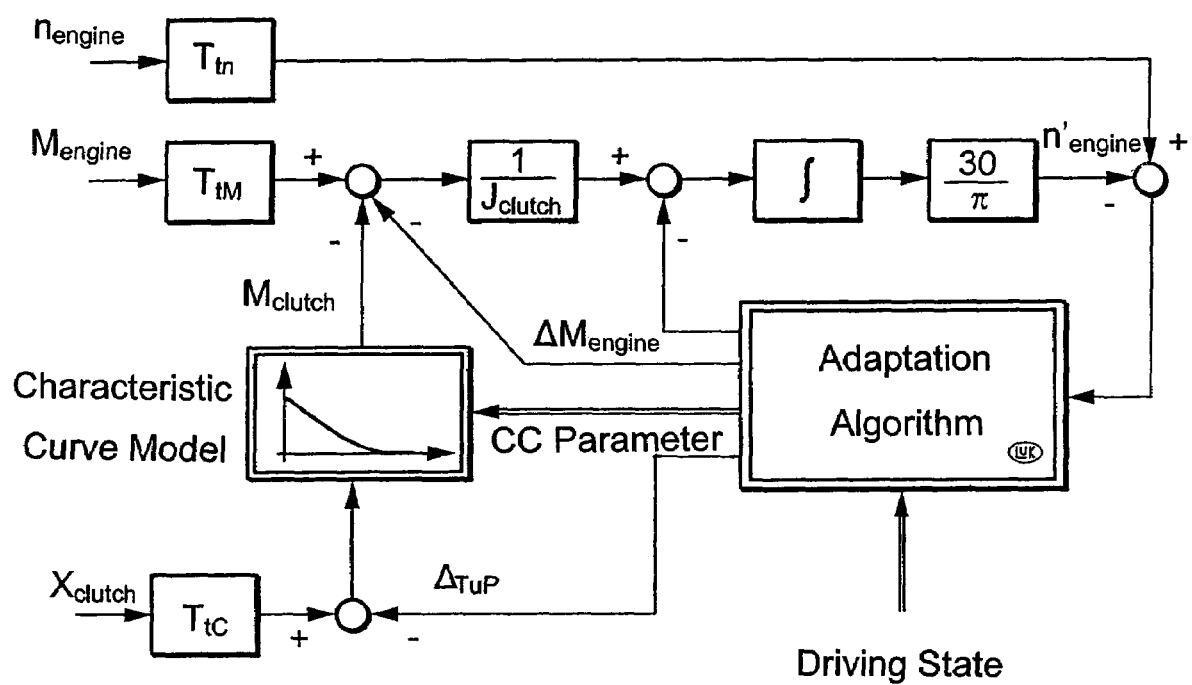
FIG. 1 represents a block diagram of an embodiment of the inventive method with an adaptation of the clutch characteristic based on a theoretical model.

FIG. 1 shows a block diagram of an adaptation of a clutch characteristic that is supported by a theoretical model. The engine rpm-rate $n_{engine}$, the engine torque $M_{engine}$, the position of the clutch actuator $X_{clutch}$, and the current driving state or operating point are provided as input quantities. The adaptation of the characteristic curve of the clutch is based primarily on the above-named input quantities or, more specifically, the signals that represent them. With the aid of delay blocks, a possible time offset between the respective signals of the input variables can be compensated for so that at the output of the delay blocks, all the signals correspond physically to the same point in time. The possible time offset between the signals can occur, e.g., in the signal acquisition and/or the signal transmission.

The delay block $T_{tn}$ is provided for the engine rpm-rate $n_{engine}$, the delay block $T_{tM}$ for the effective engine torque $M_{engine}$, and the delay block $T_{tC}$ for the position $X_{clutch}$ of the clutch actuator.

Moreover, a suitable adaptation algorithm and a predetermined characteristic curve model are integrated in the model-based adaptation of the clutch characteristic. Without taking the adaptation algorithm and its output signals into account, the system functions as follows:

The clutch torque $M_{clutch}$ is estimated from the position of the clutch actuator $X_{clutch}$ by means of the characteristic curve model. The acceleration or inertial response of the internal combustion engine is determined from the clutch torque $M_{clutch}$ and the engine torque $M_{engine}$. From this, the predicted engine rpm-rate $n'_{engine}$ can then be calculated.

From the difference between the measured engine rpm-rate $n_{engine}$ and the predicted engine rpm-rate $n'_{engine}$, it is possible to determine the quality of the model data during operation of the vehicle and to gain information for adjusting the model data to the actual physical values.

To make the aforementioned adjustment, the method calls for an adaptation algorithm that performs the adaptation of signals or parameters as a function of the respective driving state, for example a slipping state of the clutch, as a basis for the model structure shown in FIG. 1.

As a first output quantity, the adaptation algorithm provides a correction term for the engine acceleration. The correction term is used according to the principle of a status observer in order to prevent the model and reality from drifting apart.

As a second output term, the adaptation algorithm provides a torque correction term $\Delta M_{engine}$. The term $\Delta M_{engine}$ corrects a constant error of the torque signal $M_{engine}$ or an error that varies slowly over time. Such errors, which originate from uncertainties in determining the engine torque and/or from unknown torque loads of consumer devices such as the generator or the air-conditioning compressor, can usually be identified very readily as a non-zero amount of torque that is present while the clutch is disengaged and the engine is idling.

Further, as a third output term, the adaptation algorithm provides a correction term $\Delta_{TuP}$ of the clutch actuator displacement. The term $\Delta_{TuP}$ is synonymous with a so-called take-up point adaptation or contact point adaptation.

A so-called CC parameter (characteristic curve parameter) is provided as a fourth output quantity of the adaptation algorithm. This quantity has vector character and serves to adapt the friction coefficient of the clutch. By simultaneously adjusting several predetermined points of a characteristic curve, it is possible to achieve similar effects as with a multi-stage adaptation of friction coefficients.

Various methods are available for the design of the adaptation algorithm. For example, a nonlinear parameter identification, an extended Kalman filter (EKF), a neuro-fuzzy method or similar concept can be used.

In principle, the current driving status or operating point should be weighted very strongly in the design of the adaptation algorithm. Dependent on the physical boundary conditions, a difference $n_{engine}-n'_{engine}$ between the measured and the theoretically predicted engine rpm-rates will in some cases affect predominantly one adaptation quantity and in other cases predominantly another adaptation quantity. For example, the torque correction term $\Delta M_{engine}$ can be adapted when the clutch is out of engagement, and the correction term for the clutch actuator displacement $\Delta_{TuP}$ can be adapted primarily when the clutch is applied lightly, while the characteristic curve parameters, on the other hand, are to be adjusted primarily at higher clutch torques.

Figure 2:
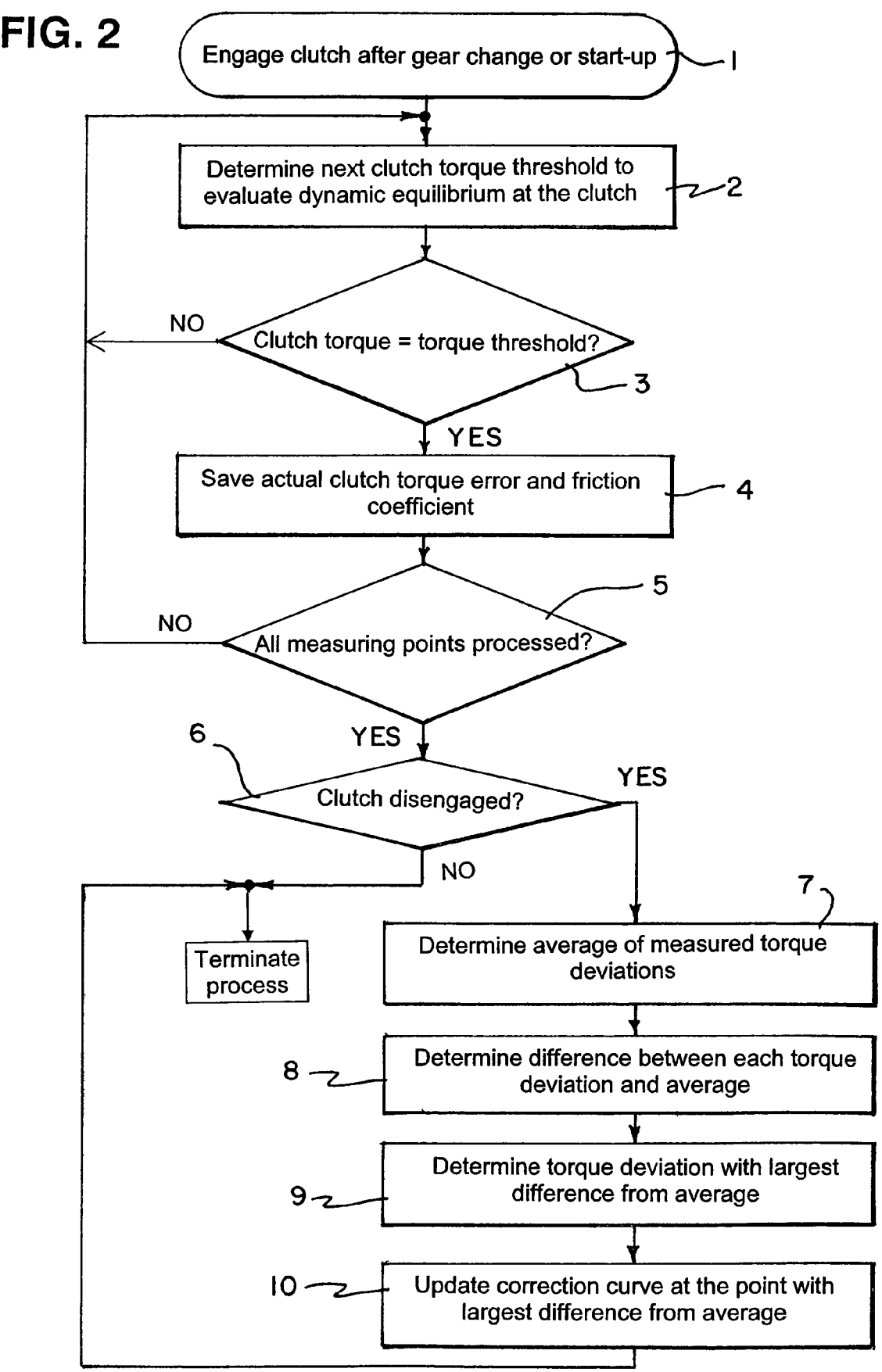
FIG. 2 represents a flowchart of another embodiment of the method according to the invention with a superimposed adaptation of the characteristic curve of the clutch.

The flowchart of FIG. 2 represents an example of how an adaptation process could be structured for correcting the shape of a clutch characteristic. The process begins at step 1 with the engagement of the clutch after a gear change or in a start-up phase of the vehicle.

In step 2 of the preferred embodiment of the method according to the invention, a next clutch torque threshold is determined for the evaluation of the dynamic equilibrium in the clutch.

This is followed by a yes/no test in step 3, as to whether the clutch torque is equal to the clutch torque threshold. In the affirmative case, the method proceeds to step 4.

In step 4 the current clutch torque error and the coefficient of friction are stored in memory.

This is followed by step 5, a yes/no test as to whether all of the measurement points have been processed. In the negative case of step 5, the process loops back to step 2. In the affirmative case, the method proceeds to step 6, a yes/no test whether the clutch is out of engagement (neutral position).

In the affirmative case of step 6, the method proceeds to step 7. In the negative case, the process is terminated.

In step 7 an average value is calculated from all of the torque deviations that have been measured.

In step 8, the individual deviation of each torque deviation from the average value is determined.

In step 9, the measured value with the largest deviation from the average value is determined.

In step 10, the final step in this process, the shape correction characteristic is updated for the point where the largest deviation of the clutch torque error from the average value was found. This ends the process.

Figure 3:
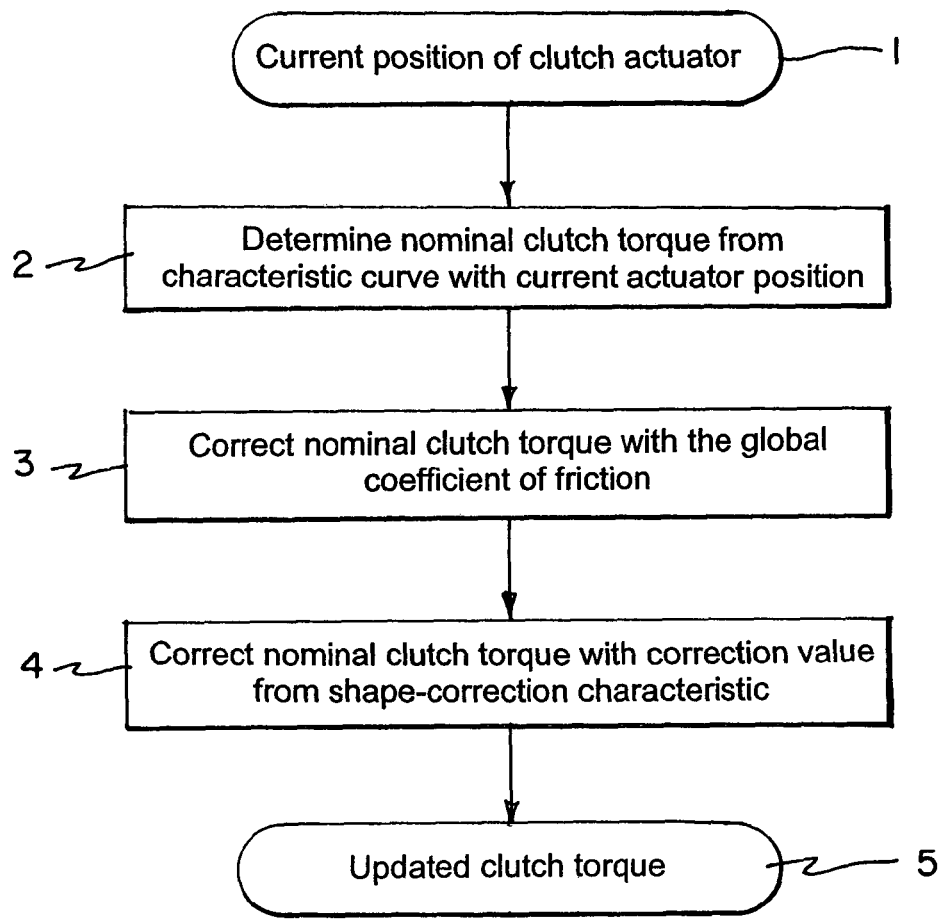
FIG. 3 represents a flowchart of a further embodiment of the method according to the invention.

The flowchart of FIG. 3 illustrates a further embodiment of the method according to the invention.

In step 1 a current actuator position is entered as an input.

In step 2 a nominal clutch torque is determined from the characteristic curve with the current actuator position.

In step 3 the nominal clutch torque is corrected with the global coefficient of friction.

In step 4, the nominal clutch torque is corrected with a correction value based on the characteristic curve for the shape correction.

In step 5, the final step, an updated value for the clutch torque is obtained as the output of the process.

The above-named method can also be carried out inversely, i.e., a theoretical actuator position can be determined from a given clutch torque.

Figure 4:
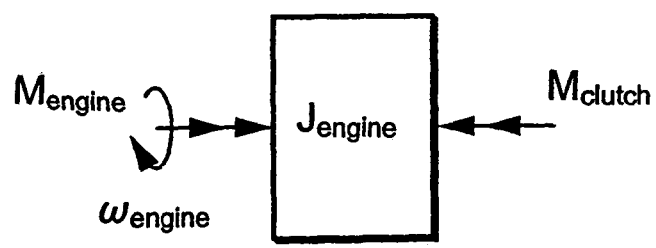
FIG. 4 represents an illustration of the torque equilibrium in a clutch.

FIG. 4 schematically illustrates the torques acting on the clutch. The clutch torque $M_{clutch}$, the engine torque $M_{engine}$, the rotary acceleration $d\omega_{engine}/dt$ of the engine, and the engine moment of inertia $J_{engine}$ are indicated in FIG. 4. The torque equilibrium at the clutch is determined from these quantities by means of the following equation:

$$J_{engine} \cdot d\omega_{engine}/dt = M_{engine} - M_{clutch}$$

Without further analysis, the foregoing will so fully reveal the essence of the present invention that others can, by applying current knowledge, readily adapt it for various applications without omitting essential generic or specific features that set the present invention apart from the prior state of the art. Therefore, such adaptations should be understood to fall within the scope and range of equivalence of the appended claims.

What is claimed is:

1. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point, wherein the adaptation of the characteristic curve is based on at least one input variable, the at least one input variable comprises at least one of an engine rpm-rate ($n_{engine}$), an effective engine torque ($M_{engine}$), and a clutch actuator position ($X_{clutch}$), wherein at least one delay block (T) is used for the adaptation of said characteristic curve, and wherein said delay block serves to compensate for a time offset due to differences in the speed of detection and transmission of different input variables.

2. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point, wherein an adaptation algorithm is used for the adaptation of said characteristic curve, and wherein the adaptation algorithm performs adaptations of signals and parameters depending on the current operating point of the vehicle, wherein the adaptation algorithm employs at least one correction term, wherein the at least one correction term comprises a correction for the rotary acceleration ($d\omega_{engine}/dt$) of the engine which serves to avoid a divergence between the model values and the actual values.

3. The method of claim 2, wherein the at least one correction term comprises a correction value ($\Delta_{TuP}$) for the clutch actuator displacement.

4. The method of claim 2, wherein the at least one correction term comprises a characteristic curve parameter (CC parameter) which serves to adapt the friction coefficient of the automated clutch.

5. The method of claim 4, wherein the CC parameter comprises a vector quantity.

6. The method of claim 2, wherein a parameter identification is used in the design of the adaptation algorithm.

7. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point, wherein an adaptation algorithm is used for the adaptation of said characteristic curve, and wherein the adaptation algorithm performs adaptations of signals and parameters depending on the current operating point of the vehicle, wherein the adaptation algorithm employs at least one correction term, wherein the at least one correction term comprises an engine torque correction value ($\Delta M_{engine}$), which serves to take signal errors of the engine torque ($M_{engine}$) into account.

8. The method of claim 7, wherein the at least one correction term comprises a correction value ($\Delta_{TuP}$) for the clutch actuator displacement.

9. The method of claim 7, wherein the at least one correction term comprises a characteristic curve parameter (CC parameter) which serves to adapt the friction coefficient of the automated clutch.

10. The method of claim 9, wherein the CC parameter comprises a vector quantity.

11. The method of claim 7, wherein a parameter identification is used in the design of the adaptation algorithm.

12. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point, wherein in the adaptation of the characteristic curve, a second adaptation is superimposed on a first adaptation, wherein the second adaptation comprises evaluating at least the shape of the characteristic curve.

13. The method of claim 12, wherein the first adaptation comprises adapting at least the friction coefficient through the steps of:

evaluating a dynamic equilibrium of the clutch and thereby determining a deviation between the torques acting on the clutch, and adjusting the friction coefficient in accordance with said deviation.

14. The method of claim 12, wherein evaluating said curve shape comprises evaluating the torque deviations at predetermined operating points of the characteristic curve, from the values of the torque deviations, determining an actual state of said curve shape, establishing a correction curve for the currently effective friction coefficient, and applying the correction curve to correct the deviations the actual characteristic curve and a nominal characteristic curve.

15. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point;

wherein the adaptation of the characteristic curve comprises:

during a slip phase of the clutch, computing a clutch torque based on an engine torque and on a rotary acceleration of the engine, and comparing the computed clutch torque to a stored characteristic curve; and wherein a torque equilibrium at the automated clutch is represented by the equation:

$$J_{engine} * d\omega_{engine}/dt = M_{engine} - M_{clutch},$$

wherein $J_{engine}$ stands for a moment of inertia of the engine, $d\omega_{engine}/dt$ stands for a rotary acceleration of the engine, $M_{engine}$ stands for the engine torque, and $M_{clutch}$ stands for the clutch torque, wherein a clutch torque to be used in controlling the clutch and a torque error are calculated through the equation:

$$M_{clutch,control} = M_{clutch} + \Delta M_{clutch}$$

$$\Delta M = M_{clutch,control} - (M_{engine} - J_{engine} * d\omega_{engine}/dt)$$

wherein $M_{clutch,control}$ stands for the clutch torque value used by the control unit and $\Delta M$ represents the torque error.

16. The method of claim 15, wherein the stored characteristic curve is corrected by the torque error.

17. The method of claim 16, wherein correcting the characteristic curve comprises adjusting a set of values representing the characteristic curve, said set of values comprising at least one of a friction coefficient and a point of incipient frictional engagement of the clutch.

18. The method of claim 16, wherein the stored characteristic curve is described by stored curve parameters and the characteristic curve is corrected by adapting at least one of the stored curve parameters.

19. The method of claim 18, wherein said adaptation of the at least one of the stored curve parameters is performed incrementally.

20. The method of claim 15, wherein the friction coefficient is lowered if the torque error is positive, and the friction coefficient is increased if the torque error is negative.

21. A method of controlling an automated clutch of a vehicle, comprising the step of adapting a characteristic curve of the clutch through an electronic clutch management system, wherein the adaptation is performed under at least one suitable set of operating conditions, said suitable set of operating conditions being represented by at least one suitable operating point; wherein the adaptation of the characteristic curve comprises:
during a slip phase of the clutch, computing a clutch torque based on an engine torque and on a rotary acceleration of the engine, and
comparing the computed clutch torque to a stored characteristic curve; and wherein an integrating method is used in the adaptation of the characteristic curve, wherein the integrating method comprises integration of torque signals to determine a model engine rpm-rate through the equation:

$$\omega_{\_engine,model} = \frac{1}{J_{engine}} \int (M_{clutch,control} - M_{engine}) dt$$

wherein $\omega_{\_engine,model}$=model engine rpm-rate.

22. The method of claim 21, wherein the adaptation comprises the steps of comparing the model engine rpm-rate and the actual engine rpm-rate, and altering the characteristic curve based on deviations detected in said comparison.

23. The method of claim 22, wherein altering the characteristic curve comprises altering at least one descriptive quantity of the characteristic curve, said characteristic quantities comprising at least one of the friction coefficient and the point of incipient frictional engagement.

24. The method of claim 23, wherein the step of altering the characteristic curve is performed incrementally in order to avoid an unstable feedback condition.

25. The method of claim 23, wherein the friction coefficient is adapted in a plurality of adaptation steps for predetermined constraint points of a friction characteristic.

26. The method of claim 25, wherein said predetermined constraint points are located in a range of high clutch torque values.

27. The method of claim 26, wherein the friction coefficient is further adapted by an additional step of transferring the adaptation that was made for the predetermined constraint points in the range of high torque values to other constraint points within a time period that includes the time during and after a full load cycle.

* * * * *